United States Patent
Oohashi et al.

(10) Patent No.: US 10,232,563 B2
(45) Date of Patent: Mar. 19, 2019

(54) METHOD OF PRODUCING UNDERCOVER FOR VEHICLE

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Satoshi Oohashi, Aichi-ken (JP); Makoto Kawamoto, Aichi-ken (JP); Takuya Shimokawa, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 242 days.

(21) Appl. No.: 15/002,572

(22) Filed: Jan. 21, 2016

(65) Prior Publication Data
US 2016/0236405 A1    Aug. 18, 2016

(30) Foreign Application Priority Data
Feb. 12, 2015 (JP) .................... 2015-025237

(51) Int. Cl.
*B29C 65/00* (2006.01)
*B29C 65/56* (2006.01)
(Continued)

(52) U.S. Cl.
CPC ............ *B29C 66/124* (2013.01); *B29C 65/56* (2013.01); *B29C 66/5412* (2013.01);
(Continued)

(58) Field of Classification Search
CPC ... B29C 65/02; B29C 66/0342; B29C 66/124; B29C 65/56; B29C 66/41;
(Continued)

(56) References Cited

U.S. PATENT DOCUMENTS

| | | | |
|---|---|---|---|
| 6,811,735 B2 | 11/2004 | Ueno et al. | |
| 2003/0020202 A1* | 1/2003 | Ueno | B29C 45/5675 264/163 |

FOREIGN PATENT DOCUMENTS

| | | |
|---|---|---|
| JP | 59-109313 | 6/1984 |
| JP | 2002-018927 | 1/2002 |

(Continued)

OTHER PUBLICATIONS

JPS59109313A_Machine Translation (Year: 1984).*
(Continued)

*Primary Examiner* — Matthew J Daniels
*Assistant Examiner* — Yunju Kim
(74) *Attorney, Agent, or Firm* — Greenblum & Bernstein, P.L.C.

(57) ABSTRACT

A method of producing an undercover for a vehicle includes: placing a first component including a planar surface, second components including planar surfaces, and a third component including a cavity with an opening in a surface such that the third component is sandwiched between the second components with the surfaces of the second components and the surface of the third components opposed to the surface of the first component; placing the sheet that is softened between the first component and the second components; vacuuming the sheet with the first component until a first surface thereof is pressed against the surface of the first component; bringing the surfaces of the second components into contact with a second surface of the sheet; and moving the third component toward the first component until the cavity is filled with a portion of the sheet while maintaining the first component and the second components thereat.

7 Claims, 6 Drawing Sheets

(51) Int. Cl.
*B62D 35/02* (2006.01)
*B29C 65/02* (2006.01)
*B29L 31/30* (2006.01)

(52) U.S. Cl.
CPC .......... *B29C 66/7392* (2013.01); *B29C 65/02* (2013.01); *B29C 66/0342* (2013.01); *B29C 66/73921* (2013.01); *B29C 66/8322* (2013.01); *B29L 2031/3005* (2013.01); *B62D 35/02* (2013.01); *Y02T 10/88* (2013.01)

(58) Field of Classification Search
CPC .......... B29C 66/5412; B29C 66/7392; B29C 66/73921; B29C 66/81455; B29C 66/8322; B29C 45/00; B29C 51/10; B29C 43/02; B29C 2043/026; B29C 43/16; B29C 2043/022; B29C 2043/023; B29C 2043/025; B29C 59/00; B29C 59/007; B29C 59/02; B29C 59/023; B29C 2059/023; B29L 2031/3005; B62D 35/02; B62D 25/20; B29K 2101/12; Y02T 10/88
USPC .................................................. 264/101, 163
See application file for complete search history.

(56) References Cited

FOREIGN PATENT DOCUMENTS

JP 2003-145617 5/2003
JP 2008247203 A * 10/2008

OTHER PUBLICATIONS

JP2008247203A_Machine Translation (Year: 2008).*
Office Action issued in Germany Counterpart Patent Appl. No. 102016102400.7 and translation thereof, dated Jul. 26, 2017.

* cited by examiner

METHOD OF PRODUCING UNDERCOVER FOR VEHICLE

CROSS REFERENCE TO RELATED APPLICATION

This application claims priority from Japanese Patent Application No. 2015-025237 filed on Feb. 12, 2015. The entire contents of the priority application are incorporated herein by reference.

TECHNICAL FIELD

The present disclosure relates to a method of producing an undercover for a vehicle.

BACKGROUND

A vehicle may include an undercover made of synthetic resin including thermoplastic. The undercover may be produced by forming a synthetic resin sheet into a designed form.

Irregular portions of the undercover are continuously formed to increase stiffness of the undercover. The irregular portions may be formed by altering a thickness of the sheet during the production of the undercover. In this case, protrusions and recesses may be formed on and in front and back surfaces of the undercover. Namely, flatness of the front surface (a surface to face a road surface) may decrease. This may increase wind drag resulting in decrease in aerodynamic performance and roadholding quality of the vehicle.

SUMMARY

The present invention was made in view of the foregoing circumstances. An object is to provide a method of manufacturing an undercover for a vehicle having higher stiffness and higher surface flatness using a sheet including thermoplastic.

A method of producing an undercover for a vehicle includes: placing a first forming component including a planar surface, a second forming components including planar surfaces, and a third forming component including a cavity with an opening in a surface thereof such that the third forming component is sandwiched between the second forming components with the planar surfaces of the second forming components and the surface of the third forming components opposed to the planar surface of the first forming component; placing a sheet made of material including thermoplastic and softened; vacuuming the sheet with the first forming component until a first surface of the sheet is pressed against the planar surface of the first forming component; bringing the planar surfaces of the second forming components into contact with a second surface of the sheet; and moving the third forming component toward the planar surface of the first forming component until the cavity of the third forming component is filled with a portion of the sheet while maintaining the first forming component and the second forming components thereat.

According to the technologies described herein, a method of producing an undercover for a vehicle having higher surface flatness and higher stiffness is provided.

DETAILED DESCRIPTION

An embodiment will be described with reference to FIGS. 1 to 6. Specifically, an engine undercover 10 and a method of producing the engine undercover 10 will be described. The engine undercover 10 covers an engine installed in a vehicle (not illustrated) from below. The engine undercover 10 is mounted to an underneath panel of a vehicle. The engine undercover 10 forms a portion of a bottom (or a bottom surface) of the vehicle.

Engine Undercover

Figure 1:
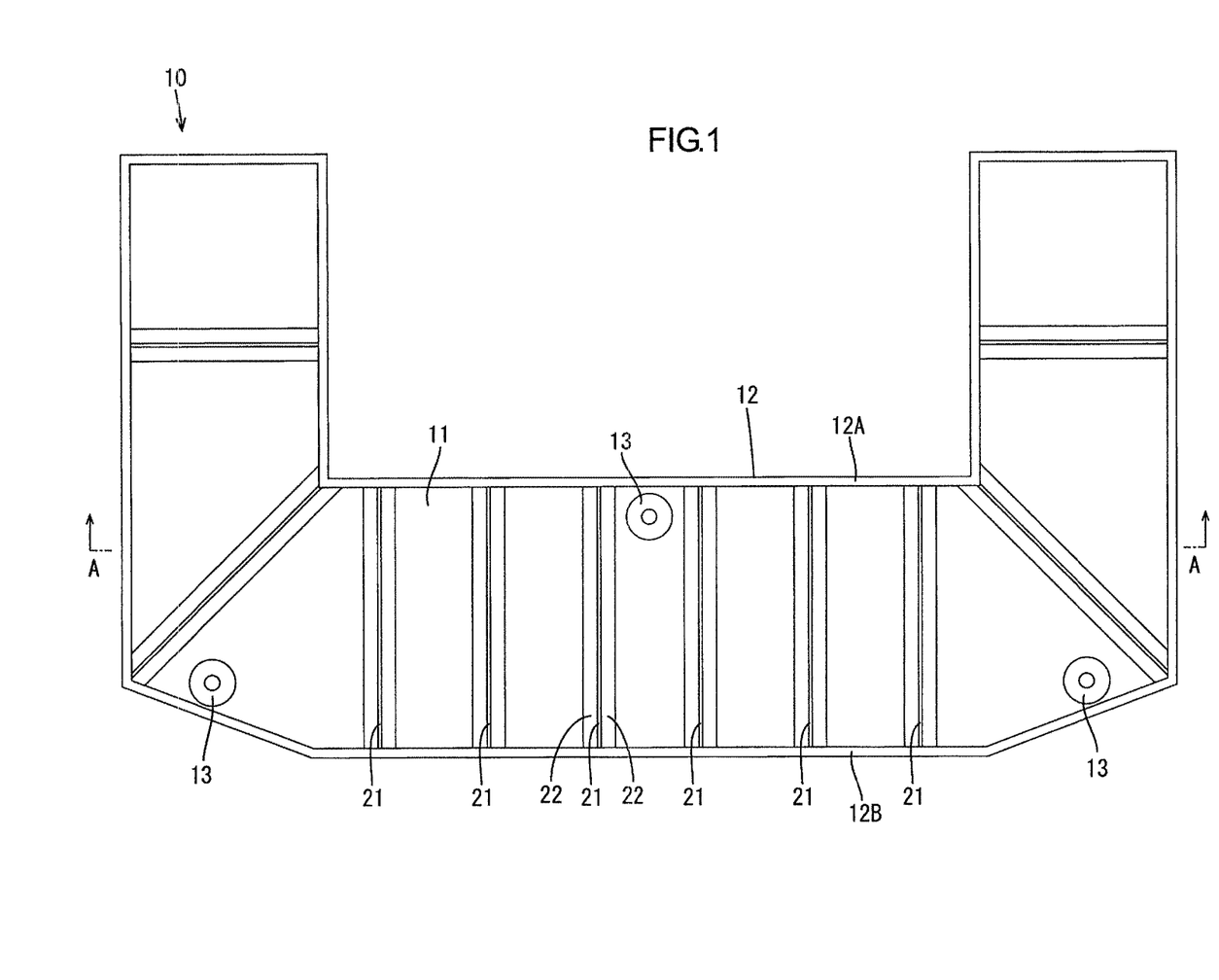
FIG. 1 is a plan view of an undercover for a vehicle according to an embodiment.
Figure 2:
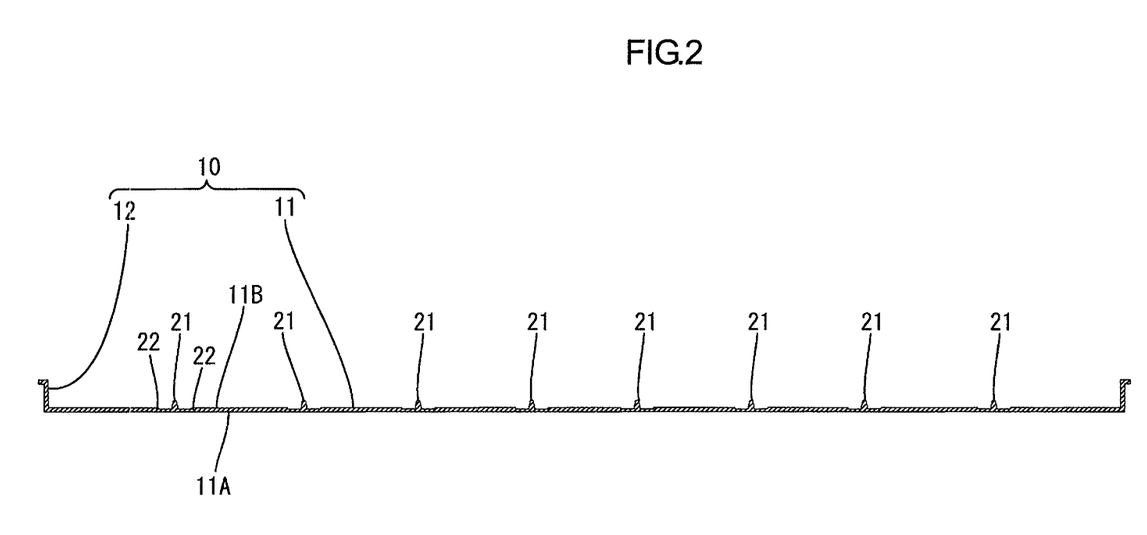
FIG. 2 is a cross-sectional view of the undercover in FIG. 1 along line A-A.

As illustrated in FIGS. 1 and 2, the engine undercover 10 is prepared by forming a synthetic resin sheet (e.g., a thermoplastic resin sheet, a polyethylene sheet) into a designed shape. The engine undercover 10 includes an undercover body 11 and projecting walls 12. The undercover body 11 has a plate-like shape. The projecting walls 12 project from respective outer edges of the undercover body 11. As illustrated in FIG. 1, the undercover body 11 has a U-like shape in a plan view. The shape of the undercover body 11 in a plan view is not limited to the U-shape. The shape of the undercover body 11 in a plan view may be rectangular or in any shape. As illustrated in FIG. 2, the undercover body 11 includes a first plate surface 11A that is a flat surface (a surface to face a road surface when the engine undercover 10 is mounted to the body of the vehicle).

The undercover body 11 further includes a second plate surface 11B (a back surface to face an engine when the engine undercover 10 is mounted to the body of the vehicle). As illustrated in FIG. 1, the engine undercover 10 includes reinforcement ribs 21 each extending from one of the edges of the undercover body 11 to the other edge of the undercover body 11. The reinforcement ribs 21 are separated from one another. Each of the reinforcement ribs 21 has an elongated shape along a short dimension of the undercover body 11. The reinforcement ribs 21 restrict the undercover body 11 from warping and maintain the stiffness of the undercover body 11. Furthermore, each of the reinforcement ribs 21 is connected between the projecting walls 12A and 12B that are opposed to each other. Namely, the reinforcement ribs 21 increase stiffness of the projecting walls 12A and 12B. As illustrated in FIG. 2, each of the reinforcement ribs 21 has a ridge-like shape that tapers toward a distal end. The shape of the reinforcement rib 21 is not limited to the ridge-like shape. A thickness of the undercover body 11 is slightly smaller in areas adjacent to bases of the reinforcement ribs 21 than in other areas of the undercover body 11. The areas adjacent to the bases of the reinforcement ribs 21 are opposed to pressing surfaces 513M of a third forming components 513 in the production of the engine undercover 10 by the method of this embodiment, which will be described later.

As illustrated in FIG. 1, the engine undercover 10 includes clip mounting bases 13 that protrude from the second plate surface 11B of the undercover body 11. Clips (not illustrated) are to be fixed to the clip mounting bases 13 for mounting the engine undercover 10 to the vehicle panel.

Forming Apparatus

Figure 3:
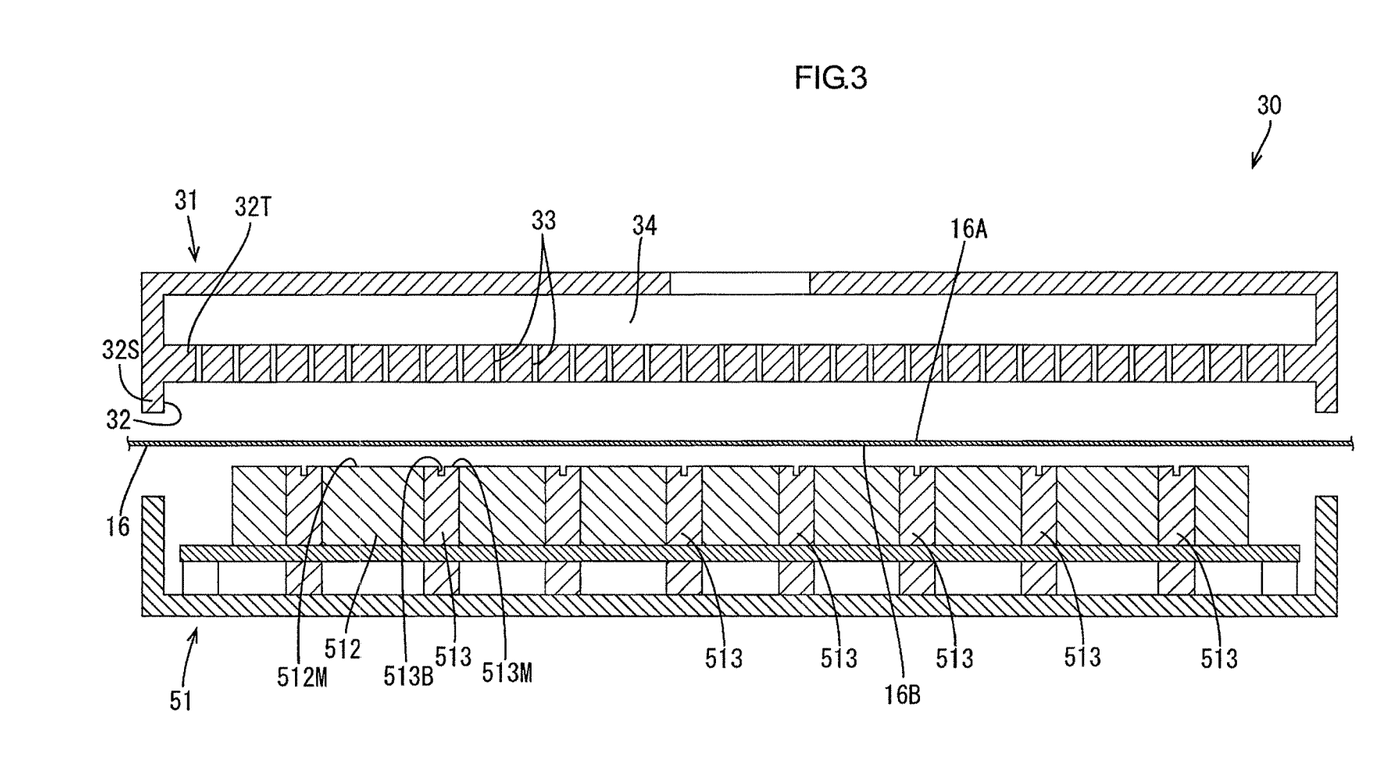
FIG. 3 is a cross-sectional view illustrating a forming apparatus for producing the undercover in FIG. 1.

Next, a forming apparatus 30 for producing the engine undercover 10 will be described. As illustrated in FIG. 3, the forming apparatus 30 includes an upper block 31 (a first forming component) and a lower block 51 (a second forming component and a third forming component). The engine undercover 10 is produced by forming a sheet 16 illustrated in FIG. 3 into the designed shape using the upper block 31 and the lower block 51. The upper block 31 and the lower block 51 are movable toward each other or away from each other by a driving mechanism (e.g., an electric motor, an air cylinder, a hydraulic cylinder), which is not illustrated. According to the configuration, the upper block 31 and the lower block 51 can be closed and open.

The upper block 31 includes a recess 32 that opens toward the lower block 51. The recess 32 is defined by a bottom wall 32T and the sidewalls 32S. The bottom wall 32T includes an opposed surface that is opposed to the lower block 51. The sidewalls 32S extend from the opposed surface toward the lower block 51 and include side surfaces and top surfaces. A portion of the upper block 31 including the bottom surface, the side surfaces, and the top surfaces is formed according to a profile of an outside of the engine undercover 10 (including the first plate surface 11A to face a road surface when the engine undercover 10 is mounted to the body of the vehicle). The opposed surface of the bottom wall 32T includes a pressing surface that is planar. The bottom wall 32T includes vacuum holes 33 having openings in the pressing surface. The vacuum holes 33 communicate with a vacuum chamber 34 in the upper block 31. An air pressure application device (not illustrated), such as a pump, is connected to the vacuum chamber 34. The sheet 16 is placed between the upper block 31 and the lower block 51, which will be described later. The air pressure application device is activated after the sheet 16 is placed between the upper block 31 and the lower block 51 to apply negative pressure to the sheet 16 through the vacuum holes 33 (to purge air).

The lower block 51 includes second forming components 512 and the third forming components 513 that are alternately arranged. The third forming components 513 are for forming the reinforcement ribs 21. The third forming components 513 are blocks each having a long dimension corresponding to a long dimension of the reinforcement rib 21 (or the short dimension of the undercover body 11). The third forming components 513 include the opposed surfaces opposed to the upper block 31. The opposed surfaces of the third forming components 513 are the pressing surfaces 513M for pressing the sheet 16. The third forming components 513 include cavities 513B for forming the reinforcement ribs 21, respectively. Each of the cavities 513B is formed in a groove-like shape having the long dimension corresponding to the long dimension of the corresponding reinforcement rib 21 and has an opening in the pressing surface 513M. Each of the cavities 513B has a shape corresponding to the corresponding reinforcement rib 21.

The second forming components 512 forms portions of the lower block 51 other than portions of the lower block 51 formed by the third forming components 513. Each of the third forming components 513 is sandwiched between adjacent second forming components 512. The second forming components 512 are blocks each having a long dimension corresponding to the short dimension of the undercover body 11. The long dimension of the second forming components 512 corresponds to the long dimension of the third forming components 513. The second forming components 512 include opposed surfaces opposed to the upper block 31, respectively. The opposed surfaces of the second forming components 512 are pressing surfaces 512M each having a planar shape. The sheet 16 includes a first surface 16A and a second surface 16B. The second surface 16B is formed with the second forming components 512 and the third forming components 513. Although the second forming components 512 and the third forming components 513 are disposed to one another without any gaps, the second forming components 512 and the third forming components 513 are individually movable.

Method of Producing Engine Undercover 10

Next, a method of producing the engine undercover 10 will be described. The method of producing the engine undercover 10 includes a vacuum forming process and a reinforcement rib forming process.

Vacuum Forming Process

Figure 4:
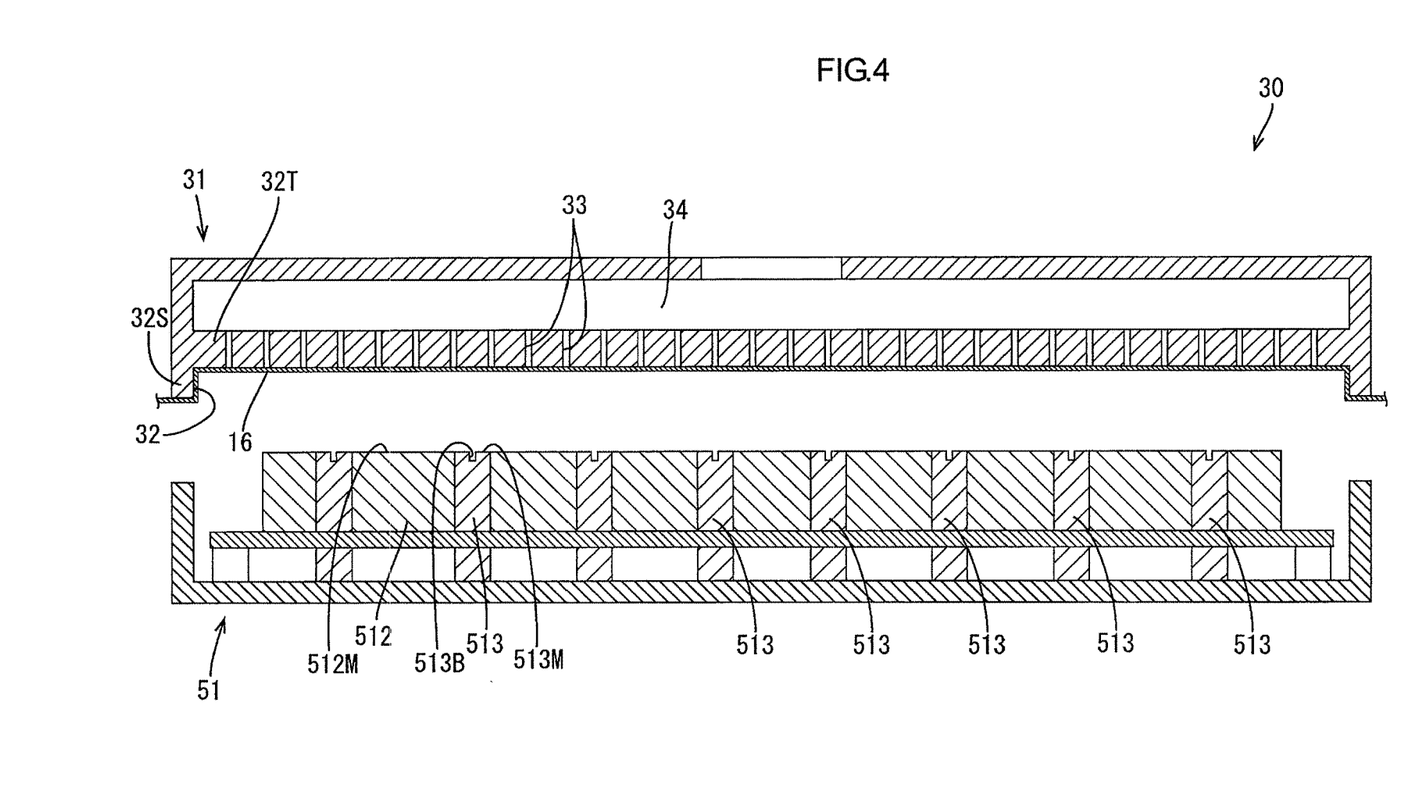
FIG. 4 is a cross-sectional view illustrating a vacuum forming process.

The sheet 16 formed by extrusion molding using an extrusion molding apparatus (not illustrated) is placed between the upper block 31 and the lower block 51. When the sheet 16 is placed between the upper block 31 and the lower block 51 immediately after the extrusion molding, the sheet 16 is still warm and soft. In the vacuum forming process, the air pressure application device is activated to apply a negative pressure to the sheet 16 through the vacuum holes 33 in the bottom wall 32T of the upper block 31. As illustrated in FIG. 4, the sheet 16 that is heated and softened is drawn to the upper block 31 and stretched onto the inner surface of the recess 32. Through this process, the first surface 16A of the sheet 16 is vacuum-formed into a shape of the recess 32. The bottom wall 32T of the recess 32 includes the planar pressing surface and thus the first surface 16A of the sheet 16 is also planar.

Reinforcement Rib Forming Process

Figure 5:
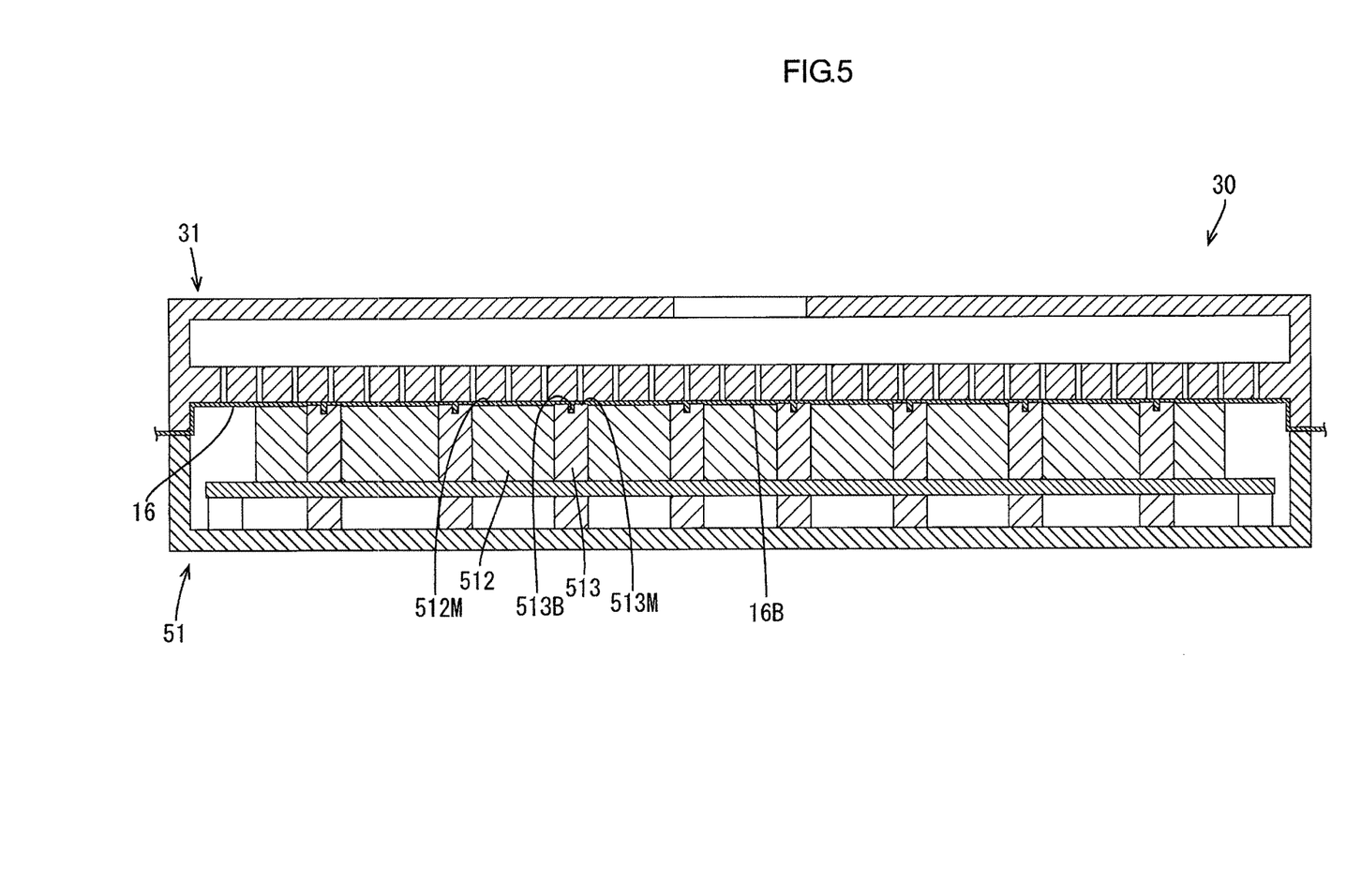
FIG. 5 is a cross-sectional view illustrating a reinforcement rib forming process.

In the reinforcement rib forming process, the second forming components 512 are moved until the planar pressing surfaces 512M are in contact with the second surface 16B of the sheet 16 that is still soft. At this point, the pressing surfaces 512M are softly pressed against the second surface 16B of the sheet 16. By setting positions of the second forming components 512, the thickness of the undercover body 11 is roughly defined. Then, the third forming components 513 are moved farther toward the opposed surface of the upper block 31 than the pressing surfaces 512M of the second forming components 512 such that the pressing surfaces 513M are pressed against the second surface 16B of the sheet 16 that is still soft. As third forming components 513 are moved farther than the second forming components 512, portions of the sheet 16 including thermoplastic in softened state enter into the cavities 513B (see FIG. 6). The portions of the sheet 16 that enter into the cavities 513B form the reinforcement ribs 21. Namely, the third forming components 513 are moved toward the opposed surface of the upper block 31 until the cavities 513B are filled with the portions of the sheet 16 while the upper block 31 and the second forming components 512 are maintained thereat. Through this process, the reinforcement ribs 21 are formed in the respective cavities 513B.

Figure 6:
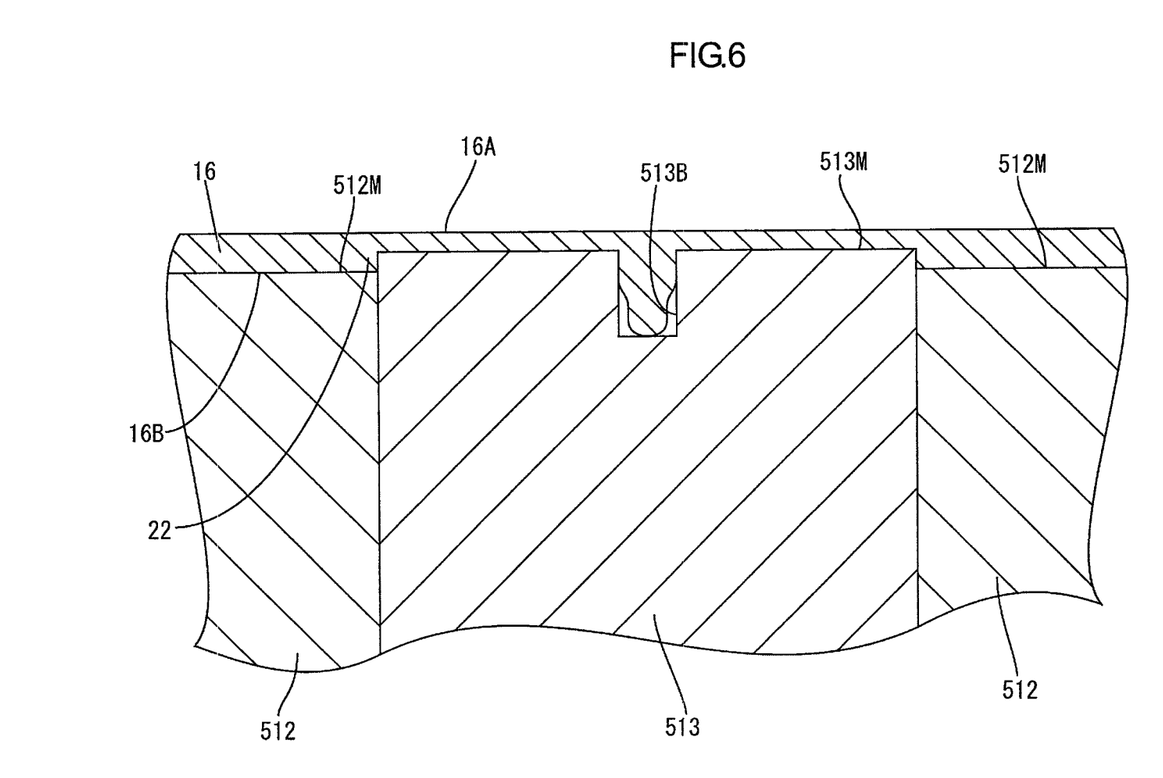
FIG. 6 is a magnified view of a reinforcement rib and therearound in FIG. 5.

The portions of the sheet 16 may move in different directions, e.g., in the horizontal direction toward sides of the third forming components 513. Because the sheet 16 is held against the upper block 31 with the second forming components 512, the portions of the sheet 16 will be stopped if they try to move farther toward the second forming components 512. Namely, the portions of the sheet 16 that is still soft properly enter into the cavities 513B without losses. Therefore, the reinforcement ribs 21 are formed with proper heights. Furthermore, the pressing forces of the third forming components 513 are larger than the pressing forces of the second forming components 512. As illustrated in FIG. 6, the thicknesses of portions of the sheet 16 opposed to the pressing surfaces 513M of the third forming components 513 are slightly smaller than the thicknesses of other portions of the sheet 16 (portions opposed to the pressing surfaces 512M of the second forming components 512). Therefore, small steps 22 are formed in the second surface 16B of the sheet 16.

After the vacuum forming process and the reinforcement rib forming process, the sheet 16 is cooled down with a cooling device (not illustrated) and transferred to a trim press (not illustrated). The sheet 16 is trimmed into the designed shape of the engine undercover 10 and this completes the production of the engine undercover 10. The second forming components 512 and the third forming components 513 form the lower block 51. The second forming components 512 and the third forming components 513 are disposed without gaps therebetween. Therefore, cooling ducts (not illustrated) for cooling down the entire area of the sheet 16 can be arranged in the lower block 51. In comparison to a configuration in which forming components for forming reinforcement ribs are separately arranged one another with gaps therebetween and cooling ducts are not provided for areas of the sheet 16 corresponding to the gaps, the cooldown time can be reduced. Therefore, the cycle time of the production of the engine undercover 10 can be reduced, that is, the efficiency in the production of the engine undercover 10 improves.

Next, some of effects of this embodiment will be described. In the vacuum forming process, the first plate surface 11A of the undercover body 11 of the engine undercover 10 is formed into the planar shape. In the reinforcement rib forming process, the reinforcement ribs 21 are formed only on the second plate surface 11B. According to the configuration, the engine undercover 10 has proper stiffness while the first plate surface 11A of the undercover body 11 has a certain level of flatness. Each of the third forming components 513 is sandwiched between the adjacent second forming components 512. According to the configuration, when the pressing surface 513M of the third forming component 513 is pressed against the sheet 16 that is heated and softened, portions of the sheet 16 are less likely to move toward the sides of the third forming component 513 and properly enter into the cavity 513B of the third forming component 513. Therefore, the reinforcement rib 21 is formed in the cavity of the third forming component 513 with a proper height. With the reinforcement ribs 21 each having the proper height, the engine undercover 10 has proper stiffness. According to the method described above, the undercover including one planar surface having the proper level of flatness while having proper stiffness is produced.

OTHER EMBODIMENTS

The technology described herein is not limited to the embodiment described in the above description and the drawings. The technology described herein may include the following embodiments. Furthermore, the configuration of the above embodiment may be altered within the scope of the present invention.

(1) The second forming components and the third forming components may be move toward the first forming component simultaneously. The surfaces of the second forming components and the third forming components opposed to the planar surface of the first forming component may be simultaneously in contact with the second surface of the sheet. Then, the third forming components may be further moved toward the planar surface of the first forming component such that the pressing surfaces thereof are pressed against the second surface of the sheet.

(2) The material of the sheet is not limited to the materials introduced earlier. The sheet may include fibers impregnated with thermoplastic (e.g., polypropylene).

The invention claimed is:
1. A method of producing an undercover for a vehicle, the method comprising:
placing a first forming component including a first planar surface, second forming components including second planar surfaces, and third forming components including third planar surfaces, each of the third forming components including a cavity with an opening in the third planar surface thereof, each of the third forming components being provided to be sandwiched between consecutive ones of the second forming components with the second planar surfaces of the second forming components and the third planar surfaces of the third forming components opposed to the first planar surface of the first forming component;
placing a sheet made of material including thermoplastic and softened between the first planar surface of the first forming component and the second planar surfaces of the second forming components;
vacuuming the sheet with the first forming component until a first surface of the sheet is pressed against the first planar surface of the first forming component;
bringing the second planar surfaces of the second forming components into contact with a second surface of the sheet after the vacuuming is completed;
after the second planar surface of the second forming components are brought into contact with the sheet, sandwiching first portions of the sheet opposed to the second planar surfaces of the second forming components between the second planar surfaces of the second forming components and the first planer surface of the first forming component;
while sandwiching the first portions of the sheet, moving the third forming components toward the first planar surface of the first forming component until a thickness of second portions of the sheet between the third planar surfaces of the third forming components and the first planar surface of the first forming component is reduced to be less than a thickness of the first portions of the sheet and the cavity of each of the third forming components is filled with a section of each of the second portions of the sheet.

2. The method according to claim 1, wherein the bringing of the second planar surfaces of the second forming components into contact with the second surface of the sheet includes moving the second forming components toward the first planar surface of the first forming component until the second planar surfaces of the second forming components are in contact with the second surface of the sheet.

3. The method according to claim 1, further comprising cooling an entire area of the sheet after the cavity of each of the third forming components is filled with the section of each of the second portions of the sheet.

4. The method according to claim 3, wherein the second forming components and the third forming components include cooling ducts, and the cooling of the sheet includes cooling the entire area of the sheet with the cooling ducts of the second forming components and the third forming components.

5. The method according to claim 1, wherein the first forming component includes a portion formed in a shape according to a profile of an outside of the undercover and including the first planar surface, and the vacuuming of the sheet continues until the first surface of the sheet is pressed against not only the first planar surface of the first forming component but other surfaces of the portion formed in the shape according to the profile of the outside of the undercover.

6. The method according to claim 2, wherein the moving of the second forming components and the moving of the third forming components are performed simultaneously until the second planar surfaces of the second forming components and the third planar surfaces of the third forming components are in contact with the second surface of the sheet, and the moving of the third forming components continues until the cavity of each of the third forming components is filled with the section of each of the second portions of the sheet.

7. The method according to claim 1, further comprising bringing the third planar surfaces of the third forming components into contact with the second surface of the sheet after the vacuuming is completed, wherein entire areas of the second planar surfaces of the second forming components and entire areas of the third planar surfaces of the third forming components opposed to the first planar surface of the first forming component are flat and flush with one another, and the second planar surfaces of the second forming components and the third planar surfaces of the third forming components are parallel to the first planar surface of the first forming component.

* * * * *